United States Patent
Goodwin et al.

(10) Patent No.: US 11,150,460 B2
(45) Date of Patent: Oct. 19, 2021

(54) CELL CULTURE MICROSCOPY SLIDES

(71) Applicant: Leica Microsystems CMS GmbH, Wetzlar (DE)

(72) Inventors: Paul C. Goodwin, Issaquah, WA (US); Jeremy R. Cooper, Issaquah, WA (US); Steven A. Reese, Issaquah, WA (US); Kathryn Buckanan, Issaquah, WA (US); Jeffrey D. Bert, Issaquah, WA (US); James T. Newberry, Issaquah, WA (US)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 37 days.

(21) Appl. No.: 15/313,018

(22) PCT Filed: May 29, 2015

(86) PCT No.: PCT/EP2015/062001
§ 371 (c)(1),
(2) Date: Nov. 21, 2016

(87) PCT Pub. No.: WO2015/181367
PCT Pub. Date: Dec. 3, 2015

(65) Prior Publication Data
US 2017/0199368 A1    Jul. 13, 2017

Related U.S. Application Data

(60) Provisional application No. 62/004,448, filed on May 29, 2014.

(51) Int. Cl.
*G02B 21/34*  (2006.01)
*B01L 3/00*   (2006.01)
*B01L 9/00*   (2006.01)
*G01N 1/30*   (2006.01)

(52) U.S. Cl.
CPC ............ *G02B 21/34* (2013.01); *B01L 3/5088* (2013.01); *B01L 9/523* (2013.01); *G01N 1/30* (2013.01); *B01L 2300/021* (2013.01); *B01L 2300/0822* (2013.01); *B01L 2300/0829* (2013.01)

(58) Field of Classification Search
CPC ....... G02B 21/34; B01L 3/5088; B01L 9/523; B01L 2300/0829; B01L 2300/021; B01L 2300/0822; G01N 1/30
See application file for complete search history.

(56) References Cited

U.S. PATENT DOCUMENTS

| | | | | |
|---|---|---|---|---|
| 3,816,045 | A  * | 6/1974  | Cawley ................. | C12M 25/02 425/175 |
| 6,309,608 | B1 * | 10/2001 | Zhou .................... | B01J 19/0046 210/321.75 |
| 6,565,813 | B1 * | 5/2003  | Garyantes ........... | B01F 13/0071 422/553 |
| 8,034,306 | B1   | 10/2011 | Grudzien et al. | |
| 8,261,598 | B2   | 9/2012  | Kim et al. | |
| 8,691,147 | B2   | 4/2014  | Leck et al. | |
| 9,575,084 | B1 * | 2/2017  | Astle ..................... | B01L 3/5023 |
| 2002/0076092 | A1 * | 6/2002  | Ellis .................... | G06K 9/00127 382/133 |
| 2003/0087292 | A1   | 5/2003  | Chen et al. | |
| 2004/0029266 | A1 * | 2/2004  | Barbera-Guillem ... | C12M 23/22 435/297.5 |
| 2004/0037739 | A1 * | 2/2004  | McNeely ............... | B01L 9/527 422/417 |
| 2004/0091939 | A1 * | 5/2004  | Cheung ............ | G01N 33/54313 435/7.1 |
| 2006/0134606 | A1 * | 6/2006  | Montagu .......... | G01N 33/54366 435/5 |
| 2009/0071834 | A1 * | 3/2009  | Hafeman .............. | G01N 1/405 204/641 |
| 2009/0141345 | A1 * | 6/2009  | Tsuchiya .............. | B01L 9/523 359/393 |
| 2011/0190154 | A1 * | 8/2011  | Agris .................... | C07K 16/18 506/9 |
| 2012/0035063 | A1 * | 2/2012  | Kim ...................... | B01L 3/5088 506/7 |
| 2012/0177543 | A1 * | 7/2012  | Battrell ............. | B01L 3/502738 422/187 |
| 2013/0050692 | A1   | 2/2013  | Tang et al. | |
| 2013/0105320 | A1 * | 5/2013  | Samson ............... | B01L 3/5085 204/461 |
| 2013/0252847 | A1   | 9/2013  | McKenna et al. | |

(Continued)

OTHER PUBLICATIONS

Chinese Offidce Action for CN Application No. 201580028414.8 dated May 24, 2018 (12 pages including English translation).

(Continued)

*Primary Examiner* — Ann Y Lam
(74) *Attorney, Agent, or Firm* — Leydig, Voit & Mayer, Ltd.

(57) ABSTRACT

Disclosed is a cell culture microscopy slide comprising an optically transparent generally flat supporting surface (20) including upper and lower opposed substrate surfaces (27, 28). A peripheral frame (40) surrounds the substrate (20), the frame (40) having a lower frame surface (44) and an upper frame surface (42). The lower frame surface (44) and the lower substrate surface (28) are generally flush. The upper frame surface (42) lies above the upper substrate surface (27), to form a well (32), and the upper and lower frame surfaces (42,44) are continuously flat and generally parallel. The substrate is preferably glass having a thickness of 1.7 mm.

20 Claims, 1 Drawing Sheet

(56) References Cited

U.S. PATENT DOCUMENTS

| | | | | |
|---|---|---|---|---|
| 2014/0235468 A1* | 8/2014 | Cheng | ................... | B01L 3/5088 |
| | | | | 506/9 |
| 2014/0323330 A1* | 10/2014 | Bergo | .............. | G01N 33/54306 |
| | | | | 506/9 |
| 2016/0038940 A1* | 2/2016 | Babcock | ............. | B81C 1/00206 |
| | | | | 422/68.1 |

OTHER PUBLICATIONS

International Search Report and Written Opinion regarding International Application No. PCT/EP2015/062001, dated Sep. 7, 2015, 10 pages.

Japanese Office Action for JP Application No. 2016-569935 dated Mar. 19, 2019 (5 pages).

\* cited by examiner

CELL CULTURE MICROSCOPY SLIDES

CROSS-REFERENCE TO RELATED APPLICATIONS

This application is a filing under 35 U.S.C. 371 of international application number PCT/EP2015/062001, filed May 29, 2015, which claims priority to U.S. application No. 62/004,448, filed May 29, 2014, the entire disclosures of each of which are hereby incorporated by reference.

FIELD OF THE INVENTION

The present invention relates to cell culture microscopy slides and in particular but not exclusively to cell culture slides for imaging in the field of immunoassays, especially immunocytochemistry (ICC).

BACKGROUND OF THE INVENTION

It is known to grow cell cultures on a microscope slide for immunoassay purposes. Generally, the user grows cells on a glass slip by placing the glass into the bottom of a disposable dish. Depending on the cell type, the glass slip may or may not be coated with a surface treatment to encourage cell adhesion to the glass surface, for example, polylysine. The size of slip used typically ranges from 12 mm circular to 25 mm square to 25×75 mm square. At a predetermined time the user removes the slip from the disposable dish with a pair of forceps, hopefully without breaking the delicate glass. The slip is placed into a fixative, normally formaldehyde in a phosphate buffer solution (PBS) but may also be methanol. This chemically fixes expressed proteins in place by cross-linking proteins together. The slip is removed from the fixative and rinsed in PBS. The user then begins a process of adding primary antibodies to the cover glass, rinsing, adding secondary antibodies, rinsing, adding DAPI (4',6-diamidino-2-phenylindole nuclear stain), rinsing, then adding a small amount of commercially available mounting media, and affixing the slip to a further glass slide with either a sealant, typically fingernail polish, or by using a hardening mounting media. The sealant or mounting media is permitted to harden and the slide assembly is ready for imaging with the stain-labelled proteins sandwiched between two pieces of glass. It is possible, with care, to repeat the steps above with different slips, thereby mounting two or more slips onto a single glass slide.

The user chooses a magnification for examining the assembled slide. If the objective lens requires a liquid immersion media, the immersion media must be added prior to examining with that objective lens. Some users may use a low magnification, air immersion lens to coarsely determine the focal plane and identify regions of interest to image at higher magnification. The assembled slide is then removed, the objective lens is changed, appropriate immersion liquid is added to either the slide or the objective, the slide is placed back onto the microscope, and the microscope is re-focused onto the sample.

This method is fraught with problems. In fact, the most difficult part of microscopy is the sample preparation and few users fully comprehend the effect that the sample plays in the optical results. Below are some of the problems faced by users new to immunofluorescence.

1. Handling the Glass Slip:

Since the glass slip is delicate and brittle, it is easy to mishandle it. This can result in the glass flipping over during handling. Since the cells are only on one side of the glass and the cells cannot be seen by eye, this leads to preparing the wrong side of the glass wasting expensive or rare materials. Also, the glass is covered with cells which are easily damaged with the forceps needed to handle them. A common problem is that the glass is broken during one of the many preparation steps leading to oddly shaped samples, wasted samples and materials, and sample contamination. Additionally, excessive handling of the glass can result in misidentification of samples which may might necessitate repeating an experiment or worse yet, incorrect results.

2. Mounting the Glass Slip:

Since the placement, size, and distribution of the glass slip on the slide is substantially random, there is no option of automatically scanning the slide to find the mounted slip, without scanning the entire slide. Also, since there can be sealant on the both sides of the glass slip, and the sealant can be of varying thickness depending on a number of factors, then the option of automatically moving from one mounted glass slip to another is limited because there is will height differences. There is often more than one glass slip mounted on a slide. Since the addition of mounting media and mounting the cover glass is done manually, these slips are usually in different focal planes which then require that the user refocuses on each glass slip region. Since the biggest microscopy problem is finding the focal plane, this leads to frustration and broken slides.

3. Material Selection:

One of the most common problems in ICC is the selection of materials. High numerical aperture lenses are specifically designed for a single glass thickness. There are a myriad of mounting media choices and many of the available choices result in poor imaging. Everything between the sample (e.g. cell) and the detector (e.g. camera) affects the contrast and resolution that can be obtained from the sample. The wrong glass thickness leads to spherical aberration and axial chromatic aberration. The wrong mounting media leads to a number of aberrations, high background, and poor contrast.

4. Microscopy, Scene Selection, and Sample Bias:

One of the hardest parts of using the microscope is finding the focal plane. This is especially difficult for sparse samples but can be problematic even for dense samples. Even the "expert" microscopist will occasionally mount the slide upside-down and spend long periods of time trying to find the focal plane only to realize the problem later. A very insidious problem that almost all users are guilty of is selection bias. Microscopists typically choose what cells to image based on visual inspection of the cells. This leads to user bias based on the definition of a "good cell". This bias is subliminal and difficult to avoid. Furthermore, it makes it difficult for others to repeat an experiment because the "good cell" is subjective. Even if the images being collected are sent to unambiguous image analysis, the selection bias is present. The scientist needs the scene or cell selection to be unbiased as well but this is rarely the case. This leads to dubious results that make their way into questionable papers that others cannot replicate.

U.S. Pat. No. 7,919,319 discloses culturing cells between two transparent plates spaced by a distance comparable to the size of the cell to be cultured thus providing a monolayer of cells, which can be observed over time by means of microscopy. This technique provides a distorted environment for cell culture because most cells grow best in clumps rather than flat arrays, and cell waste products are less able to be washed away. The technique described is of little use in ICC, because the cells are not intended to be disturbed, and so the washing and staining steps mentioned above are problematic.

The inventors have devised a microscopy slide which addresses the problems mentioned above. The invention provides a microscopy slide according to claim 1 having preferred features defined by claims dependent on claim 1. The invention provides also a method as defined by claim 6 and claims dependent thereon.

The invention extends to any combination of features disclosed herein, whether or not such a combination is mentioned explicitly herein. Further, where two or more features are mentioned in combination, it is intended that such features may be claimed separately without extending the scope of the invention.

BRIEF DESCRIPTION OF THE DRAWINGS

The invention can be put into effect in numerous ways, one illustrative embodiment of which is described below with reference to the drawings, wherein.

DETAILED DESCRIPTION OF THE INVENTION

Figure 1:
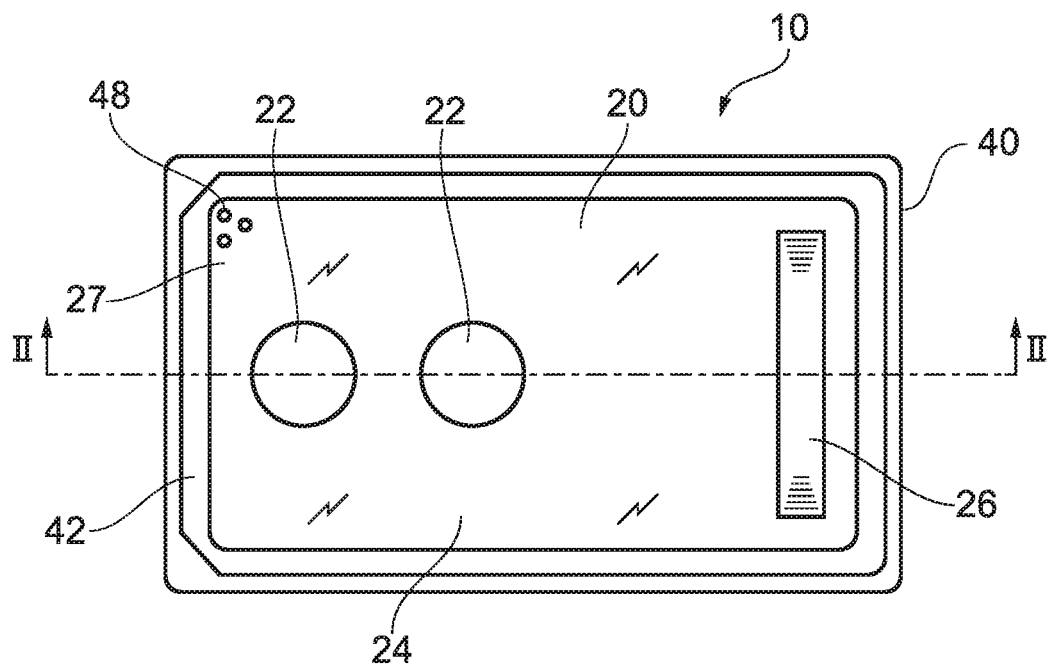
FIG. 1 shows a plan view of a microscopy slide.

The invention, together with its objects and the advantages thereof, may be understood better by reference to the following description taken in conjunction with the accompanying drawings, in which like reference numerals identify like elements in the Figures.

Figure 2:
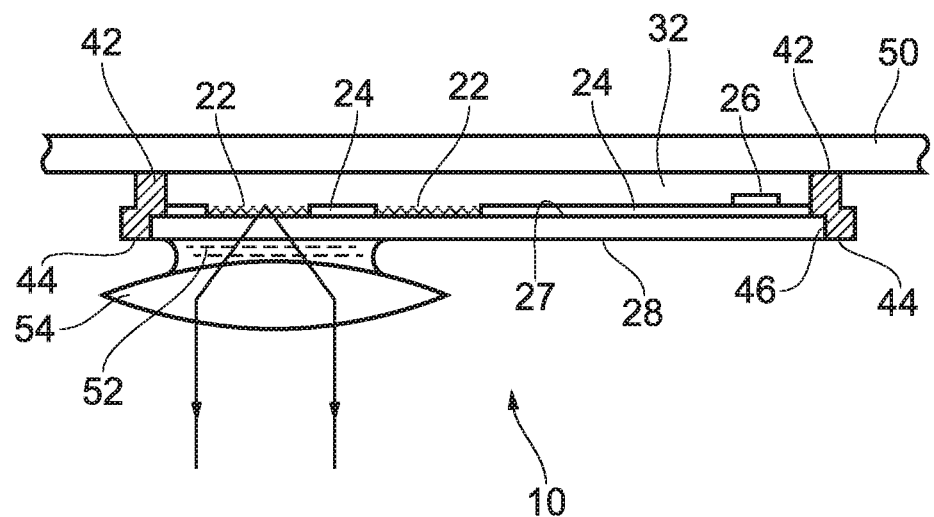
FIG. 2 shows a sectional view of the slide in use along line II-II in FIG. 1.

Referring to FIGS. 1 and 2, a microscope slide 10 is shown which includes an optically transparent generally flat substrate 20 in this case a borosilicate glass, the substrate having opposed upper and lower surfaces 27 and 28, and an outer plastics moulded peripheral frame 40. The outer size of the frame conforms to ANSI/SBS 1-2004 and 2-2004 standards. The substrate has a generally uniform thickness of 0.165 mm to 0.175 mm, preferably 0.17 mm. The substrate contains cell culture regions 22 in which cells are grown and staining is performed according to known techniques. In this embodiment, two 13 mm diameter circular regions are illustrated, although just one region could be utilised, or more regions could be used, for example up to 30,000 micro-regions could be used. The regions are separated from each other with hydrophobic material 24 applied to the substrate in all areas except the regions 22. For micro-regions the hydrophobic material can be applied by a dot matrix printer or similar technique. The hydrophobic material 24 serves to isolate the wells from each other because water-based liquids will avoid the hydrophobic areas 24 and cells will not cross hydrophobic regions. They culture regions 22 are optionally coated with α-polylysine or other commercially available materials which allow cells to adhere to the glass. Also located on the substrate is a unique identifier 26. In this case the identifier is a bar code strip, which can be read by optical means, including by a microscope to which the slide 10 is mounted. The substrate further includes alignment indicia 48, in this embodiment located at one corner of the frame, and formed by three raised dimples. The indicia allow the correct orientation of the slide 10 with respect to a microscope, and can be read by the microscope if required.

The outer frame 40 holds the substrate 20 in place, and has continuously flat upper and lower surfaces 42 and 44. Herein, 'continuously flat surfaces' means surfaces which define an unbroken circuit in one plane around the substrate. The surfaces 42 and 44 are generally parallel to each other.

The lower surface 44 includes a recessed window 46 into which snugly fits the glass substrate 20 such that a lower surface 28 of the substrate lies flush with the lower surface 44 of the frame. The upper surface 42 of the frame is higher than the upper surface 27 of the substrate 20, providing a well 32 in which cell culture media is contained in initial use.

In use, media, containing cells, is placed into one or both regions 22, a lid (not shown) is placed over the slide 10, and the slide is placed into an incubator (not shown). After a period of hours, the cells will settle onto the substrate 20 in the region, spread, and attach to the substrate surface. For longer term cultures, the media containing cells can be removed after about eight hours and the well 32 can be flooded with additional media. The cells will avoid the hydrophobic material 24 and thus no mixing of cells will occur between the wells even when the well 32 is flooded. This technique greatly simplifies the growing of cells, the fixation, the washing, and the entire ICC protocol.

When the user is ready to proceed with ICC, the media is removed from the region 22 or from the well 32 and approximately 100 µl (for a 13 mm region) of a commercially available fixative is added to each region 22. Further conventional ICC wash, incubation, wash, incubation, wash, steps are carried out according known techniques but there is no need to handle a delicate glass slip as with conventional techniques. The proteins of interest are stained according to known techniques using labelled antibodies. Upon completion of the ICC steps, approximately 5 µl of conventional mounting media is added to the each region 22 and a sealant slide 50 is placed onto the upper surface 42 of the frame. This protects the regions from dehydration, and contact damage.

The slide 10 together with the sealant slide 50 (the assembled slide) is placed on a microscope system. Where implemented, the alignment indicia are read to align the microscope table and assembled slide and the bar code identification 26 is read by the system to determine the identity of the slide, and thereby its contents. By cross-referencing the bar code to a list of known slides, the positions of the regions 22 can be readily determined. Additionally, the bar code will include an identifier to uniquely define a particular slide. In this way, there is no ambiguity about the particular sample that is being imaged and removes the need to hand-write identifiers on the slide itself. Immersion oil 52 is applied to the slide and the slide is scanned using a high numerical aperture 4× objective lens 54, for subsequent higher resolution imaging if required.

The slide 10 and its use as described above significantly increase the ease of preparation and use of a sample containing slide, particularly for immunofluorescence during ICC experiments where numerous slide preparation steps are needed. The use of the outer plastics frame 40 allows for automated handling of the slide 10 if required, and the frame is constructed to aid automation of the microscope scanning procedure. For example, the slide 10 has a completely flat lower surface 28/44, which allows an object lens (e.g. lens 54) to scan that surface without the risk of hitting any protrusions. Using a unique identifier reduces the chances of handling errors, and provides consistent automatic imaging location.

Although one embodiment only has been described and illustrated, it will be apparent to the skilled addressee that additions, omissions and modifications are possible to those embodiments without departing from the scope of the invention claimed. For example, the preferred substrate 20 is glass but other transparent materials could be employed, for example plastics. The frame 40 is preferable formed from plastics, but this includes thermoplastics and thermosetting plastics. Fibre reinforcement is contemplated. The preferred depth of the well 32 is about 2 to 6 mm, and more preferably 3 to 5 mm because this size accepts about the right volume of cell culture media, but shallower or deeper wells could be used to suit different needs.

A bar code 26 is described, but other identification means could be used, for example an RFID device could be used to automatically write identification data, and other data to the slide in order to record its preparation progress and the results of any imaging subsequently undertaken.

The slide 10 could be inverted compared with FIG. 2, such that it is viewed from above during imaging. In that case, the terms upper, lower etc. should be construed accordingly and are not intended to be limiting as regards orientation of the slide 10 shown in FIG. 2.

The invention claimed is:

1. A cell culture microscopy slide comprising:
   an optically transparent generally flat substrate including upper and lower opposed substrate surfaces; and
   a peripheral frame surrounding the substrate, the frame having a lower frame surface and an upper frame surface;
   wherein the lower frame surface and the lower substrate surface are generally flush,
   wherein the upper frame surface of the peripheral frame lies above the upper substrate surface, to form a well,
   wherein the upper and lower frame surfaces are generally parallel, and
   wherein the upper substrate surface includes areas coated with a hydrophobic material,
   wherein the upper substrate surface includes cell culture regions free from said hydrophobic material, and
   wherein the substrate has a generally uniform thickness of about 0.165 mm to about 0.175 mm.

2. A cell culture microscopy slide as claimed in claim 1 wherein the slide further includes a machine readable slide identifier.

3. A cell culture microscopy slide as claimed in claim 1 wherein the slide further includes optical machine readable alignment indicia located in one corner of the frame.

4. A cell culture microscopy slide as claimed in claim 1 wherein the substrate is glass and has a generally uniform thickness of about 0.170 mm.

5. A cell culture microscopy slide as claimed in claim 1 wherein the upper and lower frame surfaces are continuously flat.

6. The microscopy slide as claimed in claim 1, wherein the cell culture regions comprise at least two respective cell culture regions having different cell cultures.

7. The microscopy slide of claim 1, wherein the areas coated with the hydrophobic material extend below the upper frame surface and are configured to cause different cell culture compositions to flow across the cell culture regions in the well to distinct respective culture regions of the cell culture regions, and where each distinct culture region of the cell culture regions is configured to sustain different cell cultures in response to similar culture conditions.

8. The microscopy slide of claim 1, wherein the hydrophobic material spaces apart each distinct cell culture region such that no mixing of cells occurs between each distinct cell culture region of the cell culture regions in response to flooding of the well with different cell culture compositions.

9. The microscopy slide of claim 1, wherein the upper frame surface of the peripheral frame lies above the cell culture regions.

10. The microscopy slide of claim 1, wherein the peripheral frame defines two pairs of opposing ends, and wherein the hydrophobic material continuously extends along the substrate along a single continuous line or curve extending between at least one pair of opposing ends of the peripheral frame.

11. The microscopy slide of claim 1, wherein the peripheral frame and the substrate together define a single well.

12. The microscopy slide of claim 11, wherein the upper substrate surface bounded by the single well includes two or more cell culture regions free from said hydrophobic material.

13. The microscopy slide of claim 1, wherein the peripheral frame defines a single inner continuous surface defining a single well.

14. A microscopy slide preparation method, comprising the following steps:
   a) providing a cell culture microscopy slide of claim 1;
   b) seeding cells into hydrophobic material free regions of the substrate upper surface and
   c) allowing the cells to attach to the regions;
   d) incubating said seeded cells;
   e) washing the upper surface;
   f) applying at least one type of antibody to the regions to stain said regions; and
   g) observing or imaging the regions through the substrate.

15. A method as claimed in claim 14, wherein steps d) and e) are each repeated at least once before step f).

16. A method as claimed in claim 14 further including the step of flooding the well with cell culture media at least during said incubation.

17. A method as claimed in claim 14, wherein the locations of cell culture regions free from the material are determined by a machine readable slide identifier.

18. A method as claimed in claim 17, wherein the locations of the cell culture regions determined by the machine readable slide identifier are used to direct an imaging instrument toward one or more region of interest for observation or imaging.

19. A method as claimed in claim 17, wherein the slide identifier is in communication with a data store to enable recording of processing steps performed on the slide, including data relating to one or more of: biological materials; chemical treatments; therapeutic treatments, drugs process treatments, antibodies, chemical labels.

20. A method as claimed in claim 19, wherein the slide identifier enables identification of images and data derived from image analysis routines and to identify which cell culture region the image and derived data was obtained from.

* * * * *